United States Patent
Wu

(10) Patent No.: US 8,923,904 B2
(45) Date of Patent: Dec. 30, 2014

(54) SYSTEM, APPARATUS AND METHOD FOR DETERMINING RIGHT TO SPEAK

(75) Inventor: Yuchun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 906 days.

(21) Appl. No.: 12/340,153

(22) Filed: Dec. 19, 2008

(65) Prior Publication Data

US 2009/0098897 A1     Apr. 16, 2009

Related U.S. Application Data

(63) Continuation of application No. PCT/CN2007/070885, filed on Oct. 12, 2007.

(30) Foreign Application Priority Data

Dec. 13, 2006   (CN) .......................... 2006 1 0161725

(51) Int. Cl.
*H04W 74/08* (2009.01)
*H04L 29/06* (2006.01)

(52) U.S. Cl.
CPC ....... *H04W 74/0816* (2013.01); *H04L 65/4061* (2013.01); *H04L 65/4038* (2013.01)
USPC ........................................................ 455/507

(58) Field of Classification Search
CPC .......... H04W 74/0816; H04L 65/4038; H04L 65/4061
USPC ................. 370/341, 261, 338, 343, 389, 465; 455/90.2, 416, 517, 518
See application file for complete search history.

(56) References Cited

U.S. PATENT DOCUMENTS

| 5,166,675 A | 11/1992 | Amemiya et al. |
| 6,597,675 B1 * | 7/2003 | Esmailzadeh et al. ........ 370/335 |

(Continued)

FOREIGN PATENT DOCUMENTS

| CN | 1315099 A | 9/2001 |
| CN | 1460344 A | 12/2003 |

(Continued)

OTHER PUBLICATIONS

Extended European Search Report issued in corresponding European Patent Application No. 07817076.8, mailed Nov. 18, 2010.
Second Office Action issued in Chinese Patent Application No. 2007801000272.X, mailed Aug. 12, 2010.
Push-to-Talk over Cellular (PoC) User Plane; Transport Protocols; PoC Release 1.0. V1.1.0, Aug. 2003. XP-000863836.

(Continued)

*Primary Examiner* — Luat Phung
(74) *Attorney, Agent, or Firm* — Brinks Gilson & Lione

(57) ABSTRACT

Embodiments of the present disclosure disclose a system, apparatuses and methods for determining the right to speak. In the embodiments, each Secondary Protective Device (SPD) selects a Request to Send (RTS) sequence from a preconfigured RTS sequence set and sends the selected RTS sequence to a Primary Protective Device (PPD). The PPD chooses one RTS sequence from the RTS sequence sent by the SPDs and sends the chosen RTS sequence to all the SPDs and then each SPD determines whether the right to speak is obtained according to the RTS sequence from the PPD. The system, apparatuses and methods provided by the embodiments of the present disclosure ensure that the RTS sequences sent to the PPD by the SPDs are almost always different. Therefore the efficiency of determining the right to speak is greatly improved and the satisfaction of users is improved effectively.

19 Claims, 2 Drawing Sheets

(56) References Cited

U.S. PATENT DOCUMENTS

| | | | |
|---|---|---|---|
| 6,738,638 B1* | 5/2004 | Moulsley | 455/517 |
| 2005/0220050 A1 | 10/2005 | Uchida | |
| 2006/0126635 A1 | 6/2006 | Alberth, Jr. et al. | |
| 2007/0064665 A1* | 3/2007 | Zhang et al. | 370/343 |
| 2007/0147310 A1* | 6/2007 | Cai | 370/335 |
| 2007/0291708 A1* | 12/2007 | Rao | 370/338 |
| 2009/0016273 A1* | 1/2009 | Kanterakis | 370/328 |
| 2009/0098897 A1* | 4/2009 | Wu | 455/507 |
| 2009/0298487 A1* | 12/2009 | Przybysz et al. | 455/416 |
| 2010/0067495 A1* | 3/2010 | Lee et al. | 370/335 |

FOREIGN PATENT DOCUMENTS

| | | |
|---|---|---|
| CN | 1658535 A | 8/2005 |
| CN | 1756393 A | 4/2006 |
| CN | 101313531 A | 11/2008 |
| CN | 100454784 C | 1/2009 |
| EP | 1 734 721 A2 | 12/2006 |
| WO | 01/01641 A1 | 1/2001 |
| WO | WO 2006/057580 A1 | 6/2006 |

OTHER PUBLICATIONS

Office Action issued in corresponding Chinese Patent Application No. 2006101617254, mailed Mar. 9, 2011.

Written Opinion of the International Searching Authority issued in corresponding PCT Application No. PCT/CN2007/070885; mailed Jan. 24, 2008.

Office Action issued in corresponding Chinese Patent Application No. 200780000272X; issued Jul. 31, 2009.

Office Action issued in corresponding Chinese Patent Application No. 2006101617254; issued Dec. 18, 2009.

International Search Report issued in corresponding PCT/CN2007/070885; mailed Jan. 24, 2008.

Office Action issued in corresponding European Patent Application No. 07817076.8, mailed Feb. 12, 2013.

IEEE, "Part 22:1: Standard to Enhance Harmful Interference Protection for Low-Power Licensed Devices Operating in the TV Broadcast Bands," IEEE Std. 802.22.1-2010, pp. 1-131 (2010).

* cited by examiner

SYSTEM, APPARATUS AND METHOD FOR DETERMINING RIGHT TO SPEAK

CROSS-REFERENCE TO RELATED APPLICATIONS

This application is a continuation of International Application No. PCT/CN2007/070885, filed on Oct. 12, 2007, which claims priority to Chinese Patent Application No. 200610161725.4, filed on Dec. 13, 2006, both of which are hereby incorporated by reference in their entireties.

FIELD OF THE TECHNOLOGY

The present disclosure relates to radio communication technologies, and more particularly, to a system, apparatuses and methods for determining the right to speak.

BACKGROUND OF THE DISCLOSURE

In present communication systems, generally only one communication entity is allowed to send signals with a communication parameter, otherwise signal interference is most likely to occur. Therefore, each communication entity, before sending the signals, needs to first submit a sending request. When the sending request is acknowledged, the communication entity can send the signals with the appointed communication parameter.

In view of the above, a Secondary Protective Device (SPD), before sending information, needs to send a Request to Send (RTS) sequence to a Primary Protective Device (PPD). The RTS sequence sent by each SPD has the same contents.

When receiving only one RTS sequence at a given time, the PPD sends responses corresponding to the received RTS sequence to all the SPDs. Then the SPD sending the RTS sequence determines that the right to speak is obtained on receiving the response, and subsequent operations such as sending information may be performed. The other SPDs receiving the response determine that the right to speak is not obtained and need to resend the RTS sequence to the PPD after waiting for a period of time.

When receiving multiple RTS sequences at the same time, the PPD sends Negative Acknowledgment (NACK) responses to all the SPDs. And then each of the SPDs determines that the right to speak is not obtained on receipt of response and that each of the SPDs needs to resend the RTS sequence to the PPD after waiting for a period of time.

Obviously, in the above scheme, the efficiency of determining the right to speak for the SPD is low. When multiple SPDs need to send information at the same time, the RTS sequences of all the SPDs may be refused. In this case, the problem of the low efficiency of determining the right to speak is more serious, thus satisfaction of users is badly affected.

SUMMARY OF THE DISCLOSURE

Embodiments of the present disclosure provide a system and methods for determining the right to speak so as to improve the efficiency of determining the right to speak and improve the satisfaction of users.

Embodiments of the present disclosure also provide apparatuses for determining the right to speak so as to improve the efficiency of determining the right to speak and improve the satisfaction of the users.

A system for determining the right to speak that includes more than one Secondary Protective Device (SPD) for separately selecting an RTS sequence from a preconfigured Request to Send (RTS) sequence set, sending the selected RTS sequence to a Primary Protective Device (PPD) separately, and determining whether the right to speak is obtained according to a chosen RTS sequence received from the PPD separately. The PPD is configured to choose one RTS sequence from RTS sequences sent by the more than one SPD and configured to send the chosen RTS sequence to the more than one SPD respectively.

An apparatus for determining the right to speak that includes a Secondary Protective Device (SPD) choosing module configured to choose one RTS sequence from RTS sequences sent by more than one SPD and configured to send the chosen RTS sequence to the more than one SPD to determine whether the right to speak is obtained.

An apparatus for determining the right to speak includes a Request to Send (RTS) sequence processing module configured to select an RTS sequence from the preconfigured RTS sequence set and configured to send the selected RTS sequence to a Primary Protective Device (PPD), and a right-to-speak determining module configured to receive an RTS sequence sent by the PPD and configured to determine whether the right to speak is obtained according to the received RTS sequence.

A method for determining the right to speak that includes selecting a Request to Send (RTS) sequence from a preconfigured RTS sequence set, sending the selected RTS sequence to a Primary Protective Device (PPD), receiving an RTS sequence sent by the PPD, and determining whether the right to speak is obtained according to the RTS sequence received from the PPD.

A method for determining the right to speak that includes choosing an RTS sequence from RTS sequences received from more than one SPD, and sending the chosen RTS sequence to the more than one SPD.

In comparison with the conventional technologies, the system, apparatuses and methods provided by the embodiments of the present disclosure ensure that RTS sequences sent to a PPD by SPDs are almost different from each other, thus the RTS sequences received by the PPD at the same time are almost different from each other. Therefore, the PPD may determine that the right to speak is obtained by a certain SPD instead of no SPD at all, so that the efficiency of determining the right to speak is greatly improved and the satisfaction of the users is improved effectively.

DETAILED DESCRIPTION OF THE DISCLOSURE

Embodiments of the present disclosure are described as follows with reference to accompanying drawings.

A system for determining the right to speak provided by embodiments of the present disclosure includes a PPD and more than one SPD. The PPD is configured to choose an RTS sequence from RTS sequences sent by the SPDs and send the chosen RTS sequence to all the SPDs. Each of the SPD is configured to select an RTS sequence from a preconfigured RTS sequence set when a communication is needed, send the selected RTS sequence to the PPD, and determine whether the right to speak is obtained according to the RTS sequence sent by the PPD.

The PPD for determining the right to speak provided by the embodiment of the present disclosure includes a SPD choosing module to choose one RTS sequence from the RTS sequences received from more than one SPD, and send the chosen RTS sequence to all the SPDs.

The SPD for determining the right to speak provided by the embodiment of the present disclosure includes an RTS sequence processing module and a right-to-speak determining module which connect to each other. The RTS sequence processing module is configured to select the RTS sequence from the preconfigured RTS sequence set and send the selected RTS sequence to the PPD. The right-to-speak determining module is configured to determine whether the right to speak is obtained according to the RTS sequence sent by the PPD.

The method for determining the right to speak provided by the embodiment of the present disclosure includes more than one SPD, which needs to communicate, configured to select an RTS sequence from a preconfigured RTS sequence set and to send the selected RTS sequence to a PPD, the PPD configured to choose an RTS sequence from the RTS sequences received from more than one SPD and to send the chosen RTS sequence to all the SPDs, where the SPD that receives the RTS sequence to determine whether the right to speak is obtained according to the received RTS sequence.

Figure 1:
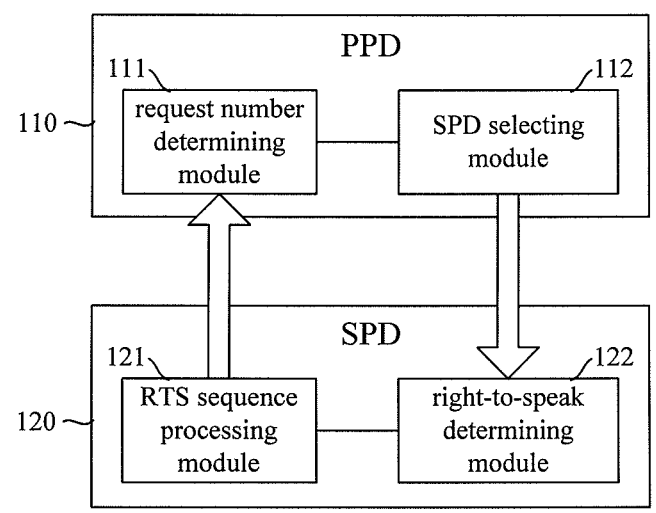
FIG. 1 is a schematic diagram illustrating a system for determining the right to speak in accordance with an embodiment of the present disclosure.

FIG. 1 shows a system for determining the right to speak in an embodiment of the present disclosure. In FIG. 1, a PPD 110 includes a request number determining module 111 and a SPD choosing module 112 connecting with the request number determining module 111. The SPD 120 includes an RTS sequence processing module 121 and a right-to-speak determining module 112 connecting with the RTS sequence processing module 121. In the system for determining the right to speak as shown in FIG. 1, the internal structure diagram of only one SPD is given. When the system for determining the right to speak includes multiple SDPs, the internal structure of the other SDPs is the same as that of the SDP shown in FIG. 1, and the connection between the PPD and the other SDPs is the same as that between the PPD and the SDP shown in FIG. 1.

Generally, the RTS sequence set may be preconfigured in the RTS sequence processing module 121. All RTS sequences in the RTS sequence set are different from each other, and there may be a good correlation property between the different RTS sequences in order to effectively reduce the probability of sending the same RTS sequence by multiple SPDs. The RTS sequence set may also be preconfigured in the right-to-speak determining module 122 or preconfigured in some other logic unit as long as the RTS sequence processing module 121 can obtain the RTS sequence set when the RTS sequence set is needed.

In addition, a NACK dedicated sequence needs to be specially defined, and the NACK dedicated sequence needs to be configured in the right-to-speak determining module 122. Therefore, when the NACK dedicated sequence is received, the right-to-speak determining module 122 can determine that the right to speak is not obtained by the SPD including the right-to-speak determining module 122. Moreover, the NACK dedicated sequence also needs to be configured in the SPD choosing module 112. Therefore, the SPD choosing module 112 can send the NACK dedicated sequence to all the SPDs when determining to refuse all the SPDs. The NACK dedicated sequence may be configured in some other logic unit as long as the SPD choosing module 112, and the right-to-speak determining module 122 can obtain the NACK dedicated sequence when the NACK dedicated sequence is needed.

In some practical applications, when communication information needs to be sent (i.e., a communication needs to be performed), the RTS sequence processing module 121 selects an RTS sequence from the RTS sequence set, and sends the selected RTS sequence to the request number determining module 111 in the PPD 110. There are a variety of methods for selecting the RTS sequence (e.g., independently and randomly selecting the RTS sequence from the RTS sequences included in the RTS sequence set, or independently, randomly and equiprobably selecting the RTS sequence from the RTS sequences included in the RTS sequence set, or independently selecting, by turns, the RTS sequence from the RTS sequences included in the RTS sequence set). Here, the independently indicates that the methods used by different SPDs for selecting the RTS sequence are independent of each other.

On receipt of the RTS sequence from the RTS sequence processing module 121, the request number determining module 111 determines the number of the received RTS sequences. When receiving only one RTS sequence, the request number determining module 111 sends the RTS sequence to the SPD choosing module 112 and also notifies the SPD choosing module 112 that only one RTS sequence is received by sending a notification such as a electric signal, etc. On receipt of the RTS sequence and the notification from the request number determining module 111, the SPD choosing module 112 directly determines that the SPD corresponding to the received RTS sequence (i.e., the SPD sending the RTS sequence) obtains the right to speak, and the SPD choosing module 112 sends the RTS sequence to the right-to-speak determining modules 122 of all the SPDs.

Upon the simultaneous receipt of multiple RTS sequences, the request number determining module 111 sends all the received RTS sequences to the SPD choosing module 112, and also notifies the SPD choosing module 112 that multiple RTS sequences are simultaneously received by sending a notification such as an electric signal etc. On receipt of the RTS sequences and the notification from the request number determining module 111, the SPD choosing module 112 chooses an RTS sequence from all the received RTS sequences and determines that the SPD corresponding to the chosen RTS sequence (i.e., the SPD sending the chosen RTS sequence) obtains the right to speak, and the SPD choosing module 112 sends the chosen RTS sequence to the right-to-speak determination modules 122 of all the SPDs.

Specifically, there are many methods used by the SPD choosing module 112 for choosing the RTS sequence (e.g., randomly choosing the RTS sequence from the received RTS sequences by the SPD choosing module 112, choosing the RTS sequence from the received RTS sequences according to a predetermined rule, or randomly choosing one RTS sequence different from the other RTS sequences from the received RTS sequences).

However, request number determining module 111 need not be an essential part of the PPD 110. Particularly, for embodiments sending the RTS sequence to the SPD choosing module 112 by the RTS sequence processing module 121. On receipt of the RTS sequence from the RTS sequence processing module 121, the SPD choosing module 112 chooses an RTS sequence to be sent to the right-to-speak determining module 122. The specific ways for choosing the RTS sequence includes the following processes. Upon receipt of only one RTS sequence, the SPD choosing module 112 directly chooses the received RTS sequence as the RTS sequence to be sent to the right-to-speak determining module 122. Alternatively, upon receipt of multiple RTS sequences simultaneously, the SPD choosing module 112 chooses the RTS sequence from the multiple RTS sequences by using the methods described above for choosing the RTS sequence and determines the chosen RTS sequence as the RTS sequence to be sent to the right-to-speak determining module 122.

The right-to-speak determining module 122 receives the RTS sequence after the above operations, and then the right-to-speak determining module 122 determines whether the received RTS sequence is identical with the RTS sequence previously sent by the RTS sequence processing module 121. If so, the right-to-speak determining module 122 determines that the right to speak is obtained by the SPD including the right-to-speak determining module 122. Otherwise, the right-to-speak determining module 122 determines that the right to speak is not obtained by the SPD including the right-to-speak determining module 122.

Generally, the RTS sequence processing module 121 makes a copy of the RTS sequence just sent and sends the copy of the RTS sequence to the right-to-speak determination module 122, and then the right-to-speak determining module 122 saves the received RTS sequence. In this way, the right-to-speak determining module 122 may compare the RTS sequence from the RTS sequence processing module 121 with the received RTS sequence to determine whether the received RTS sequence is identical with the RTS sequence previously sent. The right-to-speak determining module 122 may update the saved RTS sequence by using the RTS sequence from the RTS sequence processing module 121.

When determining that the right to speak is obtained, the right-to-speak determining module 122 may send a notification of the success in obtaining the right-to-speak to a data transceiver module connected to the right-to-speak determining module 122, and the data transceiver module may send communication information to the PPD 110 on receipt of the notification of success in obtaining the right-to-speak. When determining that the right to speak is not obtained, the right-to-speak determining module 122 may send a notification of the failure in obtaining the right-to-speak to the RTS sequence processing module 121, and upon receipt of the notification, the RTS sequence processing module 121 may reselect an RTS sequence and send the reselected RTS sequence to the request number determining module 111 immediately or after a time cycle. In addition, when there is no request number determining module 111, the RTS sequence is sent to the SPD choosing module 112.

The time cycle may be controlled by a timer. For example, a timer connected to the right-to-speak determining module 122 may be configured in the SPD 120. The right-to-speak determining module 122 starts up the timer when the right-to-speak determining module 122 determines that the right to speak is not obtained by the SPD including the right-to-speak determination module 122. When a period of time expires, the timer notifies the right-to-speak determining module 122, and when being notified, the right-to-speak determining module 122 sends to the RTS sequence processing module 121 the notification of the failure in obtaining the right-to-speak. Then the RTS sequence processing module 121 reselects an RTS sequence and sends the reselected RTS sequence to the request number determining module 111.

Alternatively, the timer may connect to the RTS sequence processing module 121. The RTS sequence processing module 121 starts up the timer when the RTS sequence processing module 121 is notified of a failure in obtaining the right-to-speak. When a period of time expires, the timer notifies the RTS sequence processing module 121. When the RTS sequence processing module 121 is notified, the RTS sequence processing module 121 reselects an RTS sequence and sends the reselected RTS sequence to the request number determining module 111.

It can be seen that the RTS sequence sent to the PPD by each SPD is in general different from each other. Even if some RTS sequences are identical, the PPD may also choose a unique RTS sequence from all the received RTS sequences and determine that the SPD corresponding to the chosen RTS sequence obtains the right to speak. In the embodiment shown in FIG. 1, the likelihood that the RTS sequences of all the SPD are refused is minimal so that the efficiency of determining the right to speak is greatly improved and the satisfaction of the users is improved.

It should be noted that the SPD choosing module 112 may be unable to find at least one RTS sequence different from the other RTS sequences in all the simultaneously received RTS sequences though this seldom occurs. In this case, the SPD choosing module 112 sends a NACK dedicated sequence to the right-to-speak determining module 122, and the right-to-speak determining module 122, on receipt of the NACK dedicated sequence, determines that the right to speak is not obtained by the SPD including the right-to-speak determining module 122. The right-to-speak determining module 122 may also notify the RTS sequence processing module 121 of a failure in obtaining the right-to-speak. After being notified, the RTS sequence processing module 121 reselects an RTS sequence and sends the reselected RTS sequence to the request number determining module 111 immediately or after a time cycle. In addition, when the request number determining module 111 is not configured, the RTS sequence is sent to the SPD choosing module 112.

Figure 2:
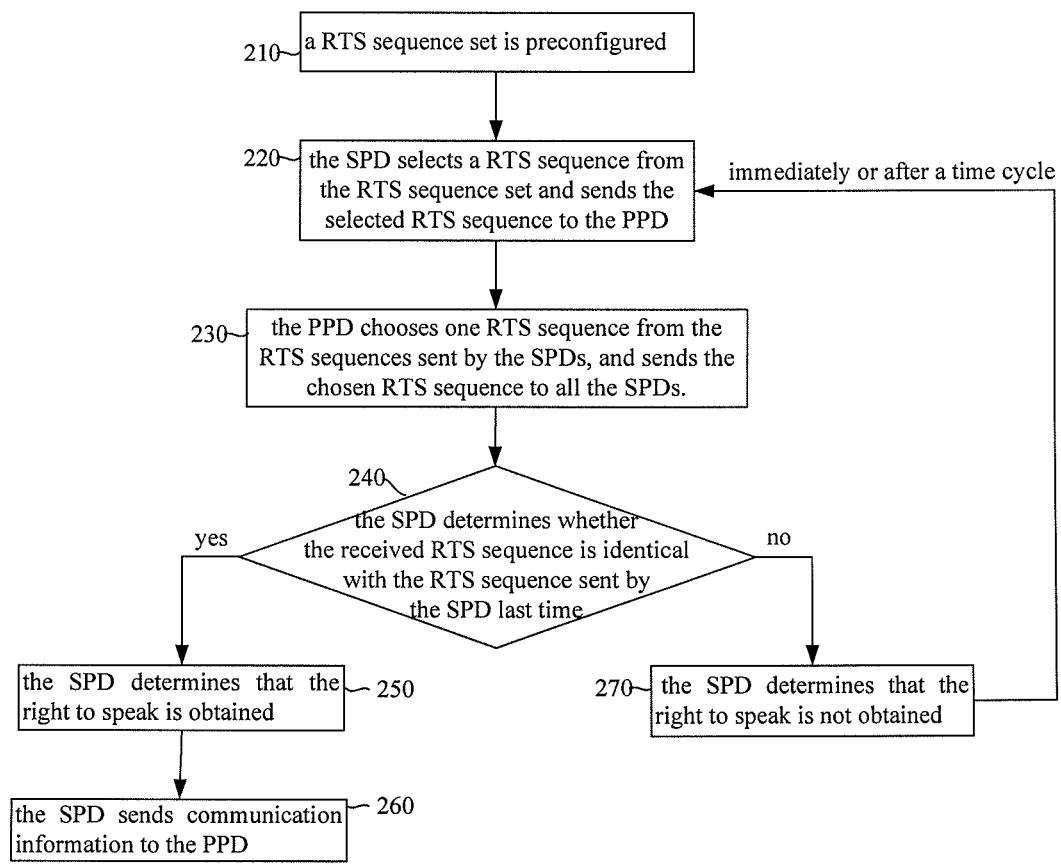
FIG. 2 is a flowchart illustrating a method for determining the right to speak used by the system shown in FIG. 1.

The system shown in FIG. 1 performs the following processes shown in FIG. 2 when determining the right to speak; FIG. 2 shows a flowchart illustrating a method for determining the right to speak used by the system shown in FIG. 1. The method includes the following processes.

At block 210, an RTS sequence set is preconfigured.

At block 220, the SPD selects an RTS sequence from the RTS sequence set and sends the selected RTS sequence to the PPD.

At block 230, the PPD chooses one RTS sequence from the RTS sequences received, and sends the chosen RTS sequence to all the SPDs.

If all the RTS sequences simultaneously received from the SPDs are identical, or at least one RTS sequence different from the other RTS sequences can not be found in all the simultaneously received RTS sequences, there is no need for the PPD to perform block 230 and subsequent blocks, and the PPD determines that the right to speak is not obtained by all the SPDs and notifies all the SPDs. There is no need for the SPD to perform the subsequent blocks after learning that the right to speak is not obtained, the SPD return to block 220 immediately or after a time cycle.

At block 240, the SPD determines whether the received RTS sequence is identical with the RTS sequence sent by the SPD last time. If so, block 250 is performed. Otherwise, 270 is performed.

At block 250, the SPD determines that the right to speak is obtained.

At block 260, the SPD sends communication information to the PPD.

At block 270, the SPD determines that the right to speak is not obtained, and block 220 is performed.

In some cases, the PPD needs to detect the RTS sequence received from the SPD. Consequently, the PPD in the embodiments of the present disclosure first detects the RTS sequences received from the more than one SPD and then chooses one RTS sequence from the detected RTS sequences. Accordingly, the RTS sequences received from the more than one SPD in the embodiments of the present disclosure indicate the RTS sequences detected from the RTS sequences which are received from the more than one SPD.

It can be seen from the above scheme, the system, apparatuses and methods provided by the embodiments of the present disclosure ensure that the RTS sequences sent to the PPD by the SPDs are almost always different from each other, so that the RTS sequences received by the PPD at the same time are usually different; therefore, the PPD may determine that the right to speak is obtained by a certain SPD instead of no SPD at all, so that the efficiency of determining the right to speak is greatly improved and the satisfaction of the users is improved effectively.

The invention claimed is:

1. A system for determining a right to speak, comprising:
more than one Secondary Protective Devices (SPDs), each of the more than one SPDs configured to:
separately select a respective Request to Send (RTS) sequence from a preconfigured RTS sequence set,
separately and simultaneously, send the respective selected RTS sequence to a Primary Protective Device (PPD), wherein each respective selected RTS sequence sent by each of the more than one SPDs is unique and different from each other;
separately receive one chosen RTS sequence sent by the PPD, wherein the one chosen RTS sequence is chosen by the PPD from among the received respective selected RTS sequences simultaneously sent from the more than one SPDs;
separately determine whether the right to speak is obtained, wherein:
the right to speak is subsequently obtained by a particular one SPD from among the more than one SPDs, if the particular one SPD determines that the one chosen RTS sequence received from the PPD is identical to the respective selected RTS sequence sent to the PPD by the particular one SPD,
the right to speak is not subsequently obtained, if the particular one SPD determines that the one chosen RTS sequence received from the PPD not identical to the respective selected RTS sequence sent to the PPD by the particular one SPD.

2. The system of claim 1, wherein the cross correlation between preconfigured RTS sequence sets is less than a predetermined range.

3. The system of claim 1, wherein the PPD is further configured to send each of the more than one SPDs a Negative Acknowledgement (NACK) response used to indicate that the right to speak is not subsequently obtained by the more than one SPDs when at least one RTS sequence different from the other RTS sequences in the RTS sequences sent by the more than one SPDs can not be found.

4. The system of claim 1, each of the more than one SPDs further comprising: a timer, for timing and sending a notification to the each of the more than one SPDs when the timer expires, wherein each of the more than one SPDs is further configured to start up the timer when determining that the right to speak is not subsequently obtained, reselect an RTS sequence from the RTS sequence set, and send the reselected RTS sequence to the PPD when receiving the notification.

5. An apparatus for determining a right to speak comprising a Primary Protective Device (PPD), the PPD comprises:
a Secondary Protective Device (SPD) choosing module configured to choose one chosen Request to Send (RTS) sequence from among a plurality of respective selected RTS sequences separately and simultaneously sent by more than one other SPDs, wherein each of the respective selected RTS sequences sent by the more than one SPDs is unique and different from each other, and wherein the SPD choosing module simultaneously sends the one chosen RTS sequence to each of the more than one SPDs in order to facilitate a determination of whether the right to speak is subsequently obtained by a particular one SPD among the more than one other SPDs, wherein:
the right to speak is subsequently obtained by the particular one SPD, if the one chosen RTS sequence received from the PPD is determined to be identical to the respective selected RTS sequence sent to the PPD by the particular one SPD,
the right to speak is not subsequently obtained, if the one chosen RTS sequence received from the PPD is determined to be not identical to the respective selected RTS sequence sent to the PPD.

6. The apparatus of claim 5, further comprising:
a request number determining module configured to receive the RTS sequences from the more than one SPD and send the received RTS sequences to the SPD choosing module.

7. The apparatus of claim 6, wherein the request number determining module is further configured to send the number of the received RTS sequences to the SPD choosing module; and
the SPD choosing module is further configured to choose the RTS sequence from the RTS sequences according to the number of RTS sequences.

8. The apparatus of claim 5, wherein the SPD choosing module is further configured to send each of the more than one SPDs a Negative Acknowledgement (NACK) response used to indicate that the right to speak is not subsequently obtained by the more than one SPDs when at least one RTS sequence different from the other RTS sequences in the RTS sequences sent by the more than one SPDs can not be found.

9. An apparatus for determining a right to speak, the apparatus comprising a Secondary Protective Device (SPD) being in an environment with the presence of at least one other SPD, the SPD having:
a Request to Send (RTS) sequence processing module configured to select a respective RTS sequence from a preconfigured RTS sequence set, and separately and simultaneously with the at least one other SPD, sends the respective selected RTS sequence to a Primary Protective Device (PPD) wherein the respective selected RTS sequence sent by the SPD is unique and different from another respective selected RTS sequence simultaneously sent by the at least one other SPD; and
a right-to-speak determining module configured to receive from the PPD one chosen RTS sequence, wherein the one chosen RTS sequence is chosen by the PPD from among the respective RTS sequences simultaneously sent from the SPD and the at least one other SPD, and determine whether the right to speak is subsequently obtained, wherein:
the right to speak is subsequently obtained, if the one chosen RTS sequence received from the PPD is determined to be identical to the respective selected RTS sequence simultaneously sent to the PPD with the at least one other SPD,
the right to speak is not subsequently obtained, if the one chosen RTS sequence received from the PPD is determined to be not identical to the respective selected RTS sequence simultaneously sent to the PPD with the at least one other SPD.

10. The apparatus of claim 9, wherein the RTS sequence processing module is further configured to copy the RTS sequence sent to the PPD and send the copy of the RTS sequence to the right-to-speak determining module; and the right-to-speak determining module is further configured to determine whether the right to speak is subsequently obtained according to the RTS sequence received from the PPD and the copy of the RTS sequence sent to the PPD.

11. The apparatus of claim 9, wherein the right-to-speak determining module is further configured to determine that the right to speak is not subsequently obtained when receiving a NACK response sent by the PPD.

12. The apparatus of claim 9, wherein the right-to-speak determining module is further configured to notify a data transceiver module to send communication information to the PPD when the right to speak is subsequently obtained and notify the RTS sequence processing module to reselect an RTS sequence from the RTS sequence set and send the reselected RTS sequence to the PPD when the right to speak is not subsequently obtained.

13. The apparatus of claim 9, further comprising:
a timer configured to time and send a notification to the right-to-speak derterminning module when the timer expires; wherein
the right-to-speak derterminning module is further configured to start up the timer when determining that the right to speak is not subsequently obtained, and notify the RTS sequence processing module to reselect an RTS sequence from the RTS sequence set and send the reselected RTS sequence to the PPD when receiving the notification.

14. The apparatus of claim 12, further comprising:
a timer configured to time and send a notification to the RTS sequence processing module when the timer expires; wherein
the RTS sequence processing module is further configured to start up the timer when notified to reselect the RTS sequence; and reselect the RTS sequence and send the reselected RTS sequence to the PPD when receiving the notification.

15. A method for determining a right to speak by a particular one SPD among a plurality of SPDs, comprising:
selecting by each of the plurality of SPDs, a respective Request to Send (RTS) sequence from a preconfigured RTS sequence set;
simultaneously and separately, sending by each of the plurality of SPDs the respective selected RTS sequence to a Primary Protective Device (PPD), wherein each of the respective selected RTS sequence sent by each of the plurality of SPDs is unique and different from each other;

simultaneously and separately, receiving by each of the plurality of SPDs one chosen RTS sequence sent by the PPD, wherein the one chosen RTS sequence is chosen by the PPD from among the received respective RTS sequences simultaneously sent from the plurality of SPDs; and determining whether the right to speak is subsequently obtained by the particular one SPD among the plurality of SPDs, wherein:
the right to speak is subsequently obtained by the particular one SPD, if the one chosen RTS sequence is identical with the respective selected RTS sequence sent by the particular one SPD to the PPD;
the right to speak is not subsequently obtained by the particular one SPD if the one chosen RTS sequence is determined to be not identical with the respective selected RTS sequence sent by the particular one SPD to the PPD.

16. The method of claim 15, wherein selecting the RTS sequence from the preconfigured RTS sequence set comprises:
selecting the RTS sequence independently and randomly from the RTS sequence set;
selecting the RTS sequence independently, randomly and equiprobably from the RTS sequence set; or
selecting, by turns, the RTS sequence independently from the RTS sequence set.

17. The method of claim 15, wherein the determining whether the right to speak is subsequently obtained according to the RTS sequence received from the PPD comprises:
determining whether the RTS sequence received from the PPD is identical with the selected RTS sequence sent to the PPD; and
determining the right to speak is subsequently obtained when the RTS sequence received from the PPD is identical with the selected RTS sequence sent to the PPD; or
determining the right to speak is not subsequently obtained when the RTS sequence received from the PPD is not identical with the selected RTS sequence sent to the PPD.

18. The method of claim 15, further comprising:
determining the right to speak is not subsequently obtained when receiving a NACK response from the PPD.

19. The method of claim 15, further comprising:
sending communication information to the PPD after determining that the right to speak is subsequently obtained; or
reselecting an RTS sequence from the RTS sequence set and sending the reselected RTS sequence to the PPD after determining that the right to speak is not subsequently obtained.

* * * * *